United States Patent
Landman

(10) Patent No.: US 9,895,826 B2
(45) Date of Patent: *Feb. 20, 2018

(54) PREFORM, CONTAINER AND METHOD FOR FORMING A CONTAINER

(71) Applicant: HEINEKEN SUPPLY CHAIN B.V., Amsterdam (NL)

(72) Inventor: Bernardus Cornelis Johannes Landman, Boskoop (NL)

(73) Assignee: HEINEKEN SUPPLY CHAIN B.V., Amsterdam (NL)

(*) Notice: Subject to any disclaimer, the term of this patent is extended or adjusted under 35 U.S.C. 154(b) by 1 day.

This patent is subject to a terminal disclaimer.

(21) Appl. No.: 14/314,201

(22) Filed: Jun. 25, 2014

(65) Prior Publication Data

US 2014/0305898 A1    Oct. 16, 2014

Related U.S. Application Data

(63) Continuation of application No. 13/382,126, filed as application No. PCT/NL2010/050418 on Jul. 2, 2010, now Pat. No. 8,851,322.

(30) Foreign Application Priority Data

Jul. 3, 2009    (NL) ...................................... 2003131

(51) Int. Cl.
*B29B 11/04* (2006.01)
*B29B 11/14* (2006.01)
(Continued)

(52) U.S. Cl.
CPC .............. *B29B 11/04* (2013.01); *B29B 11/14* (2013.01); *B29C 49/00* (2013.01); *B29C 49/12* (2013.01); *B29C 49/4252* (2013.01); *B65D 1/0246* (2013.01); *B29B 11/08* (2013.01); *B29B 11/10* (2013.01); *B29B 2911/1402* (2013.01); *B29B 2911/1404* (2013.01); *B29B 2911/1408* (2013.01); *B29B 2911/1414* (2013.01);
(Continued)

(58) Field of Classification Search
CPC ............. Y10T 29/4997; Y10T 29/4998; B29C 2049/021; B29C 49/02; B29B 11/04
USPC ..... 220/592.16, 592.18, 604, 610, 612, 613, 220/DIG. 1; 215/44; 264/523, 531, 512, 264/513; 425/523
See application file for complete search history.

(56) References Cited

U.S. PATENT DOCUMENTS 5,008,066 A    4/1991    Mueller
5,301,838 A    4/1994    Schmidt et al.
(Continued)

FOREIGN PATENT DOCUMENTS

DE    19547425 A1    7/1997
EP    1003686 A1    5/2000
(Continued)

*Primary Examiner* — James N Smalley
*Assistant Examiner* — Madison L Poos
(74) *Attorney, Agent, or Firm* — Pearne & Gordon LLP

(57) ABSTRACT

Preform (1) or preform assembly for blow molding a container (23), wherein the preform of preform assembly has a neck portion (4), a lid element (16) being provided at the neck portion, an opening extending into the neck portion, providing access to an internal space of the preform or preform assembly. Method for blow molding a container. Container blown from a preform or preform assembly.

20 Claims, 5 Drawing Sheets

(51) Int. Cl.
  B29C 49/12 (2006.01)
  B29C 49/00 (2006.01)
  B29C 49/42 (2006.01)
  B65D 1/02 (2006.01)
  B29B 11/08 (2006.01)
  B29B 11/10 (2006.01)
  B29C 49/06 (2006.01)
  B29C 65/06 (2006.01)
  B29C 65/08 (2006.01)
  B29C 65/16 (2006.01)
  B29C 65/48 (2006.01)
  B29C 65/58 (2006.01)
  B29C 65/00 (2006.01)
  B29K 23/00 (2006.01)
  B29K 25/00 (2006.01)
  B29K 67/00 (2006.01)
  B29K 69/00 (2006.01)
  B29K 105/00 (2006.01)
  B29L 31/56 (2006.01)
  B29L 31/00 (2006.01)

(52) U.S. Cl.
  CPC ........... *B29B 2911/1416* (2013.01); *B29B 2911/14026* (2013.01); *B29B 2911/14033* (2013.01); *B29B 2911/1444* (2013.01); *B29B 2911/1452* (2013.01); *B29B 2911/14053* (2013.01); *B29B 2911/14066* (2013.01); *B29B 2911/14093* (2013.01); *B29B 2911/14106* (2013.01); *B29B 2911/14113* (2013.01); *B29B 2911/14133* (2013.01); *B29B 2911/14166* (2013.01); *B29B 2911/14326* (2013.01); *B29B 2911/14333* (2013.01); *B29B 2911/14413* (2013.01); *B29B 2911/14593* (2013.01); *B29B 2911/14666* (2013.01); *B29C 49/06* (2013.01); *B29C 65/06* (2013.01); *B29C 65/0672* (2013.01); *B29C 65/08* (2013.01); *B29C 65/16* (2013.01); *B29C 65/48* (2013.01); *B29C 65/58* (2013.01); *B29C 66/124* (2013.01); *B29C 66/3022* (2013.01); *B29C 66/5344* (2013.01); *B29C 66/5346* (2013.01); *B29C 66/545* (2013.01); *B29C 66/71* (2013.01); *B29K 2023/06* (2013.01); *B29K 2023/12* (2013.01); *B29K 2025/00* (2013.01); *B29K 2067/00* (2013.01); *B29K 2067/006* (2013.01); *B29K 2069/00* (2013.01); *B29K 2105/258* (2013.01); *B29L 2031/565* (2013.01); *B29L 2031/7158* (2013.01); *Y10T 428/13* (2015.01)

(56) References Cited

U.S. PATENT DOCUMENTS

| | | | |
|---|---|---|---|
| 5,332,121 | A | 7/1994 | Schmidt et al. |
| 5,352,402 | A * | 10/1994 | Orimoto ............... B29C 49/16 264/230 |
| 5,407,629 | A | 4/1995 | Schmidt et al. |
| 5,662,245 | A | 9/1997 | Grant |
| 6,375,048 | B1 | 4/2002 | van der Meer et al. |
| 6,793,095 | B1 | 9/2004 | Dulisse et al. |
| 8,028,857 | B2 | 10/2011 | Rasmussen |
| 2006/0186136 | A1 | 8/2006 | Wauters et al. |
| 2006/0283879 | A1 | 12/2006 | Rasmussen |
| 2009/0320264 | A1 | 12/2009 | Berger et al. |
| 2010/0102071 | A1 | 4/2010 | Wauters et al. |
| 2011/0049193 | A1 | 3/2011 | Muller et al. |
| 2013/0334160 | A1 | 12/2013 | Berger et al. |

FOREIGN PATENT DOCUMENTS

| | | |
|---|---|---|
| EP | 1626925 A2 | 2/2006 |
| JP | S54-085260 A | 7/1979 |
| JP | H11-292049 A | 10/1999 |
| JP | 2003-505270 A | 2/2003 |
| WO | 9212926 A1 | 8/1992 |
| WO | 9911563 A1 | 3/1999 |
| WO | 01/07235 A1 | 2/2001 |
| WO | 2004050539 A2 | 6/2004 |
| WO | 2004099060 A2 | 11/2004 |
| WO | 2008048098 A1 | 4/2008 |
| WO | 2008083782 A2 | 7/2008 |
| WO | 2008098937 A1 | 8/2008 |

* cited by examiner

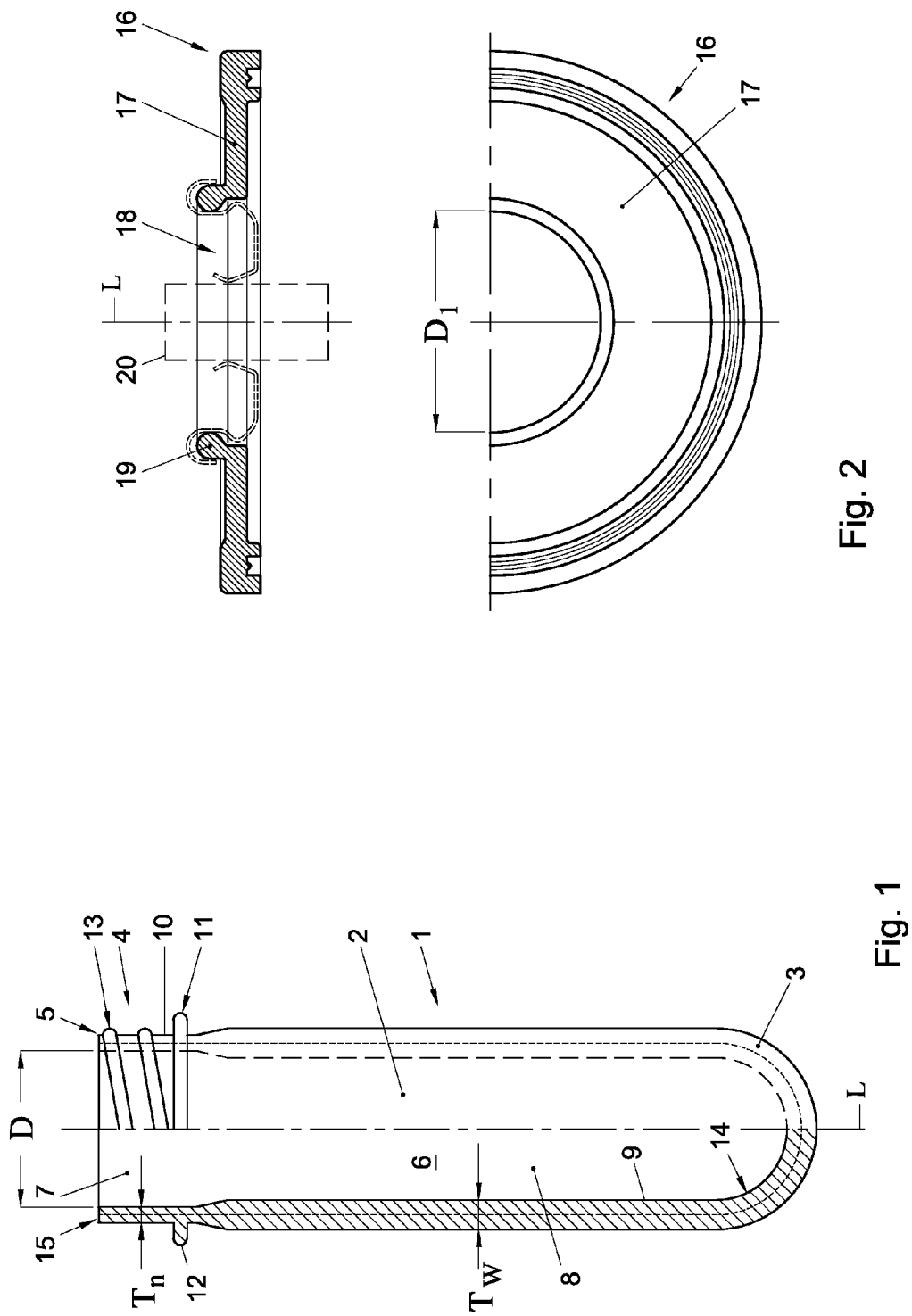

PREFORM, CONTAINER AND METHOD FOR FORMING A CONTAINER

FIELD OF THE INVENTION

This disclosure is directed to a preform and to a method for blow moulding a container.

DESCRIPTION OF RELATED ART

Blow moulding is a well know technique for manufacturing containers, such as but not limited to bottles for beverages. In this technique a plastic preform is moulded, for example by injection moulding. The preform is heated to a temperature below the melting temperature of the plastic. A blow moulding tool is inserted into the preform, which is placed inside a blow moulding mould, having the shape of the desired container. With the blow moulding tool the preform is stretched and then the preform is blown to the desired shape against the inner surface of the mould.

In some cases it is desirable to have a lid element attached to such blow moulded container.

In WO 2008083782 a container is shown having a valve assembly provided in a neck portion by using a welding method, such as ultrasonic welding or laser welding. This valve assembly is welded into the neck region after blow moulding the container.

In WO 2008098937 a container is shown having a valve assembly provided in a neck portion by using a laser welding method. This valve assembly is welded into the neck region after blow moulding the container, by directing a laser beam though a wall of the neck portion onto an annual part of the valve assembly.

It is desirable to provide an alternative method and preform for manufacturing blow moulded containers having a lid element attached thereto.

SUMMARY OF THE INVENTION

In a first aspect the present description is related to a preform for blow moulding a container, wherein a lid element is attached to the preform before blow moulding a container from the preform.

In another aspect the present description is directed to a method for blow moulding a container from a preform. The method can comprise the step of first attaching a lid element to the preform and then blow moulding the container from the preform.

In still another aspect the description is directed to a container, blow moulded from a preform of this description or using method steps according to the description.

Other aspects of preforms and methods are further disclosed in the dependent claims.

BRIEF DESCRIPTION OF THE DRAWINGS

In order to further clarify the subject of this disclosure, embodiments of a preform, method and container are discussed hereafter, with reference to the drawings, which are only schematically representations. In these drawings:

FIG. 1 schematically shows a first embodiment of a preform;

FIG. 2 schematically shows a lid element, in cross section and partially in bottom view;

DETAILED DESCRIPTION OF PREFERRED EMBODIMENTS OF THE INVENTION

Figure 3:
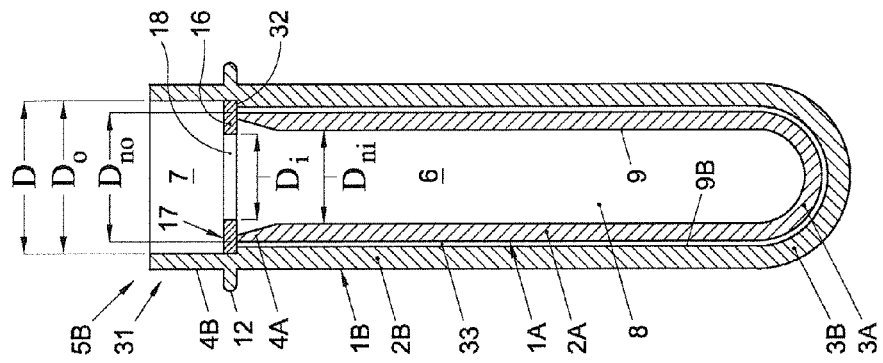
FIG. 3 schematically shows the preform of FIG. 1 with a lid element attached at the neck portion.

In this description embodiments are described with respect to plastic containers, blow moulded, such as stretch blow moulded, from a preform, wherein a preform can for example be manufactured by injection moulding or extrusion. These containers can be used for example but not limited to storage of beverages, such as but not limited to carbonated beverages. Obviously the containers can be made of other materials, such as blends of plastics, combinations of plastics and metals, such as metal foils, scavengers and the like. The embodiments are disclosed only as exemplary embodiments and are not to be considered as limiting the disclosure in any way.

In this description blow moulding has to be understood as at least comprising but not limited to stretch blow moulding, wherein a preform is heated, stretch lengthwise and blown into a desired shape. During lengthwise stretching the preform can already be blown to some extent.

In this description a preform, which can also be a parison, has to be understood as at least including but not limited to an element injection moulded from plastic, to be blown into a blow moulded container. In this description preforms shall be described for blow moulding containers which basically have a bottle shape, including a neck portion, a body portion and a bottom portion, but it will be obvious to any skilled person that different shapes of containers can be made using different shapes of preforms falling within the same inventive concept. A preform can be single or multi layer. A multi layer preform can be manufactured using well known techniques, such as but not limited to co-injection, co-extrusion or over moulding. A multi layer preform can have a delaminating layer or layers.

In this description wording like about and substantially should be understood as meaning that variations of a given value it refers to are allowable within the given definition, which variations can at least be 5%, preferably at least 10% and more preferably at least 15% of the given value.

In this description preforms and containers will be discussed made of PET or PET blends. However, preforms and containers according to the present disclosure could also be made of different materials, blends or combinations of materials, such as but not limited to polypropylene or polystyrene, PEN, polyethylene, Polycarbonate, PBT, blends of the forgoing or combinations thereof. In case of PET or PET blends, standard PET has to be understood in this respect as at least including PET without added additives for preventing crystallisation of the PET during forming such as injection moulding of a preform.

In this description reference shall be made to containers for holding and dispensing beverages, especially carbonated beverages such as beer and soft drinks. However other contents can be stored and dispensed using a container according to this description.

In the present disclosure preforms can be formed of a plastic material that can be stretch blow moulded into a container having a relatively thin wall or combination of walls, wherein the preform is substantially amorf, whereas the bottle is at least partly crystalline. Preferably the preform is formed of a material substantially free of crystallisation preventing additives, such as glycol. It has been recognised that such additives can be favourable in injection moulding a preform substantially amorf, but these additives remain in the blown container, which is detrimental to the strength and/or stiffness of the container. The preforms are preferably injection moulded having a wall thickness sufficiently small to substantially prevent crystallisation of the plastic material.

For containers stretch blow moulded from a preform, having an internal volume, especially a volume of more than 3 liters, the opening of a preform is to be relatively large, for example 2 cm or more. Providing a rug element with a smaller opening; enables easy placement of a valve or valve assembly with smaller dimensions. For example, when standard aerosol type valves, spray can type valves or the like are used, for example to be clinched, such is advantageous.

In FIG. 1 a preform 1 is shown, injection moulded in a commonly known method. The left side of FIG. 1 shows the preform 1 in cross section, the right side in side view. The preform 1 can have a substantially cylindrical wall 2 with a closed first end 3 and a neck portion 4 at the opposite second end 5. An inner volume 6 extends from a neck opening 7 into an inner space 8. The inner space 8 is largely defined by an inner surface 9. The wall 2 surrounding the inner space 8 can have a thickness $T_w$ which can be for example the same or larger than the thickness $T_n$ of the neck portion 4. On an outside 10 of the neck portion 4 grip elements 11 can be provided, for example one or two flanges 12, and/or screw threads 13. The or each flange 12 can extend substantially perpendicular to a longitudinal axis L of the preform 1. If there is more than one such flange 12, they can extend substantially parallel to each other. In the embodiment of FIG. 1 one such flange 12 is shown. Flanges 12 are common and can be used for handling the preform 1 and/or a container 23 blown from it. Moreover these can be used for rigidifying the neck portion 4, in order to maintain its shape and dimensions as good as possible. Another aspect can be that these flanges allow other elements to be attached to the neck portion, such as but not limited to lids, dispense mechanisms, top ring structures and the like. Embodiments can be comprised having flanges that are of different diameters.

In the embodiment of FIG. 1 the inner surface 9 extends directly and continuously into the neck portion 4. Apart from the part 14 at the first end 3, which can be substantially spherical or shaped for forming a petal shaped bottom, the inner surface 9 can be substantially cylindrical. The neck portion 4 can have, at the first end 3, a substantially flat, circular end surface 15. In another embodiment the neck portion can have a differently shaped end surface 15, for example but not limited to partly or completely conical, recessed or toothed. In another embodiment the end surface can have a shape different from circular, such as but not limited to oblong, oval, square, rectangular or multi angled.

In FIG. 2 a lid element 16 is shown, partially in cross section. In this embodiment the lid element 16 is substantially ring shaped, having a peripheral ring 17 and a central opening 18. The central opening 18 can be provided in a tubular portion 19 extending from or through the ring 17. An outer surface of the tubular portion 19 can in such an embodiment be useful in attaching elements to the lid element 16, such as but not limited to a valve 20, schematically shown in FIG. 2 in broken lines, clinched to the portion 19, a lid, an aeration device or the like. A lid element 16 can be made of a plastic material similar to that of the preform 1. In another embodiment the lid element 16 can be made of a material different from the material of the preform. In an embodiment the lid element 16 can be made partly or entirely of metal. In an exemplary embodiment the preform and the lid element can both be made of PET or PEN or a blend containing at least PET or PEN. In an embodiment such blend can comprise at least 50 weight % of PET and/or PEN. In a further embodiment the blend can comprise at least 75 weight % or PET and/or PEN. In an embodiment the preform 1 and/or the lid element 16 can be made of a plastic material having $CO_2$ and/or $O_2$ barrier properties. The preform 1 can have multiple layers, one of which, especially an inner layer, can be at least partly detachable from the further layer(s) of the preform 1. In an embodiment the preform 1 and the lid element 16 can be made of materials that can be welded or glued.

In FIG. 3 a preform 1 is shown, with a lid element 16 attached at the neck portion 4. In this embodiment the lid element 16 is placed with the ring 17 on the end surface 15 permanently. In an embodiment the lid element 16 can be attached to the surface 15 by welding. In an embodiment the welding can be achieved by ultrasonic welding. In still another embodiment the welding can be achieved by a welding technique chosen from the group of ultrasonic welding, laser welding, friction welding, spin welding or pressure welding. In still another embodiment the lid element 16 can be connected to the preform 1 by gluing. In another embodiment the lid element 16 can be permanently or releasably connected to the preform 1 by other means, such as but not limited to a snap connection, press fit, friction locking, screw thread, bayonet locking or other such means known in the art for connecting two elements.

As can be seen in FIG. 3 the lid element 16 allows access into the inner volume 6 of the preform 1. In an embodiment the access to the inner volume 6 can be through the lid element 16, especially through the opening 18 therein. The access can be available for a blow moulding tool 21, schematically shown in FIG. 3 in broken lines. Such blow moulding tool 21 can for example be an element having a longitudinal axis $L_t$, substantially coinciding during use with the longitudinal axis L of the preform 1. A forward end 22 can be pushed against the first end 3 of the preform 1, which can be heated to a temperature below the melting temperature of the plastic material of the preform 1, but sufficiently high to make the material pliable, such that the preform 1 can be stretched in the longitudinal direction. Then gas such as air can be forced through the tool 21 and into the inner volume 6 of the preform, blowing up the preform 1 to a container 23 of a desired shape and dimension. In an embodiment the outer surface of the tool 21 can lie against the inner wall of the preform before blowing. In another embodiment the outer surface of the tool 21 can lie at least partly spaced apart from the inner wall of the preform 1.

Figure 4:
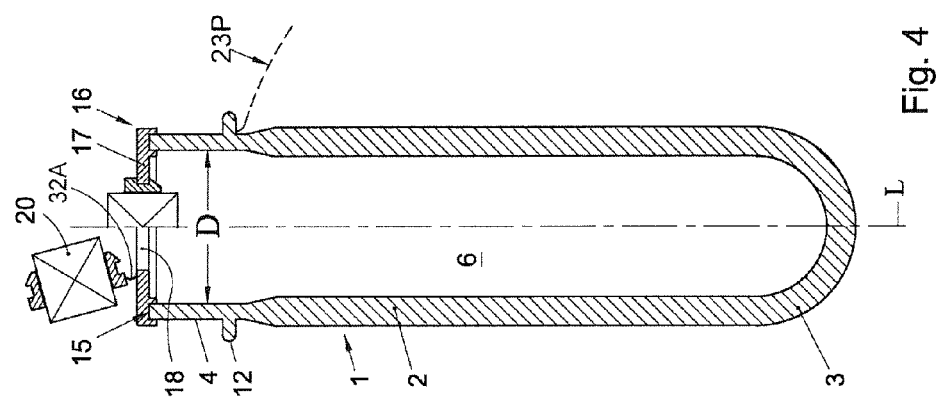
FIG. 4 schematically shows a second embodiment of a preform.

In an embodiment of the present description first a preform 1 is injection moulded. A lid element 16 can be manufactured separately, for example by machining, pressing or injection moulding. In a different embodiment the lid element 16 can be formed together with the preform, for example injection moulded with a collapsible core or in a two or more component (2K) injection moulding process. In still another embodiment the lid element 16 can be hinged to the preform, for example to a neck portion 4 thereof, and/or a valve 20 can be hinged to the ring 17, as shown in FIG. 4, and forced over the opening of the neck portion after injection moulding and cooling. In a further embodiment the lid element 16 can be mounted on the neck portion 4 in a different way, for example by welding, such as spin welding, ultrasonic or laser welding, conventional welding, screwing, bayonet locks, snap elements such as a snap ring or snap hooks or a press fit. In another embodiment the lid element can be glued to the preform. The lid element 16 can be mounted or provided for within the apparatus in which the preform 1 and/or the lid 16 is or are made.

Figure 8:
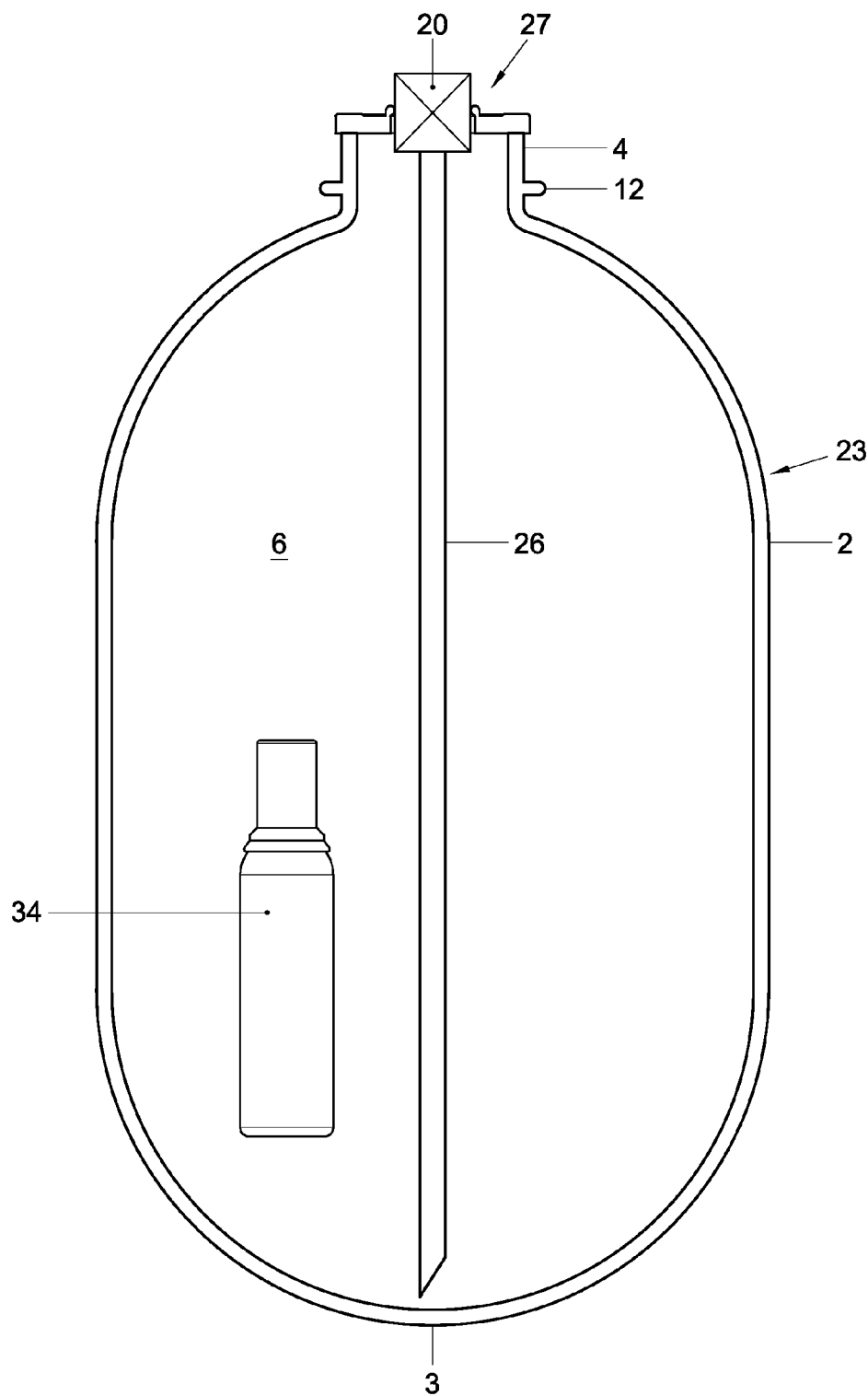
FIG. 8 schematically shows a container manufactured according to the description.

After or directly prior to mounting the lid element 16 to the preform 1 the preform 1 can be moved to a blow moulding station, where the preform 1 can be blown into the desired container 23, as for example shown in FIG. 8. Then the container 23 can be moved to a filling station, where a beverage can be injected into the container in a known and suitable manner. The preform 1 is preferably provided with the lid element 16 before blow moulding, especially before shipment from the one or more injection moulding apparatus. This may make the manufacturing easier and prevents shipping of fully or even partly blown but, apart form air, empty containers such as bottles or kegs, which would be environmentally unfriendly. Moreover, by providing the lid 16 on the preform prior to filling, especially prior to shipment thereof to a bottler, the lid elements 16 do not have to be stored and shipped separately and the providing of the lid elements 16 does not have to be done in a wet or otherwise possibly hostile environment.

After filling the container 23 with the beverage in a further station other elements can be added to the container 23, such as a closure, closing the container 23, or a valve or valve assembly 20, such as for example but not limited to a combination of a beverage valve and a gas valve. Such valve assembly can be a known type valve assembly such as a Sankey type or a flat head type assembly. In another embodiment a dispensing device, such as a riser pipe 26 and connector or locking element 27 can be provided in the lid 16, as for example shown in FIGS. 7 and 8, for allowing the container 23 to be connected to a dispensing device 30, as for example shown in FIG. 8, for dispensing the beverage. Such dispensing devices are for example known from EP 1003686 or WO2004/050539 or EP 1626925. Other dispensing devices can be for example regular devices having a tapping head to be connected to the neck 4 of the container 23, for introducing a pressure gas such as $CO_2$ into the container and allowing beverage to be dispensed form the container, for example to a beverage engine, a tapping cock 30A or the like. In still another embodiment a valve 20 such as an aerosol type valve can be provided in the lid 16, for dispensing the beverage and in an alternative embodiment also for introducing a pressure gas into the container 23. Such valve is for example known from WO 2008/048098.

In an embodiment the preform 1 can be designed for blow moulding a container 23 having a content of between 1 and 10 liters, for example between 2 and 6 liters. In an embodiment the container 23 can have a content of about 5 liters. In an embodiment the preform 1 can be designed for stretch blow moulding a container 23 having a content of over 10 liters, for example between 10 and 50 liters. In an embodiment the container can have a content of between 15 and 30 liters, for example about 17 to 20 liters. A preform 1 according to the disclosure can be made of a single material, such as but not limited to PET, PEN, PP, PS, PC or another thermoplastic material and/or crystallizing and/or stretch blow mouldable plastic material or combinations of such materials. In another embodiment the preform can be multi layered, comprising layers of a similar or different materials such as plastics or plastic blends. Multi layer bottles are known in the art and shall not be discussed here extensively. An example of a multi layer bottle and a dispensing device for such bottle are disclosed in WO 92/012926. The content of this application is incorporated herein by reference, at least for the dispensing devices, bottles and materials disclosed therein.

The preform 1 can have a neck portion 4 with an internal cross section perpendicular to a longitudinal axis A-A, which cross section has a surface area formed by or comparable to a circular area having a diameter D of more than 2 cm, for example a diameter between 2 and 10 cm, more specifically between 3 and 6 cm, such as for example about 49 mm. The lid element 16 can have a central opening 18 with an inner surface area formed by or comparable to a circular surface having a diameter $D_1$ for example between 0.5 and 6 cm, for example between 0.5 and 4 cm, the area being smaller than the area of the opening 7 of the neck portion 4. The opening 18 can be circular and can be designed to have a valve such as an aerosol valve 20 fitted in or over it. In another embodiment the lid element 16 can have different openings 18, for example two, side by side, such that for example in one of the openings 18 a dispensing element can be fitted, such as a valve 20 with or without a riser pipe 26 for dispensing the content of the container 1, such as a beverage, for example beer, whereas in the other opening 18A a gas inlet can be attached, such as for example a $CO_2$ source or an air pump 31A.

In an embodiment the preform can be injection moulded, after which the lid element 16 is provided on and/or in the preform 1 or one of the preforms in a preform assembly. Then the preform(s) can be transferred to a bottling line, in which preforms are in line blow moulded and filled with for example a beverage such as but not limited to beer. In an embodiment then a valve assembly 20 or a dispensing assembly 30 or part thereof can be placed in and/or on the opening 18.

In FIG. 4 a preform 1 is shown, schematically in cross section, a lid element 16 in the form of a ring 17 with a valve 20 attached to it via for example an integrated hinge 32A is shown. In this embodiment the ring 17 is mounted on the preform 1, for example welded to it, wherein the valve 20 is folded away from the central opening 18, such that the container 23 can be blow moulded from it and a filling pipe can be introduced into the container 23 through said opening 18, where after the valve 20 can be folded into the opening 18, closing off the container 23. In the embodiment shown the valve 20 is enclosed in a clamping tube that can be clamped into the opening 18, as is schematically shown in FIG. 4 on the right hand side. The valve 20 is preferably pushed into the opening 18 after blow moulding a container 23 from the preform and filling the container 23. In FIG. 4 schematically a shoulder part 23P of a container is shown.

Figure 5:
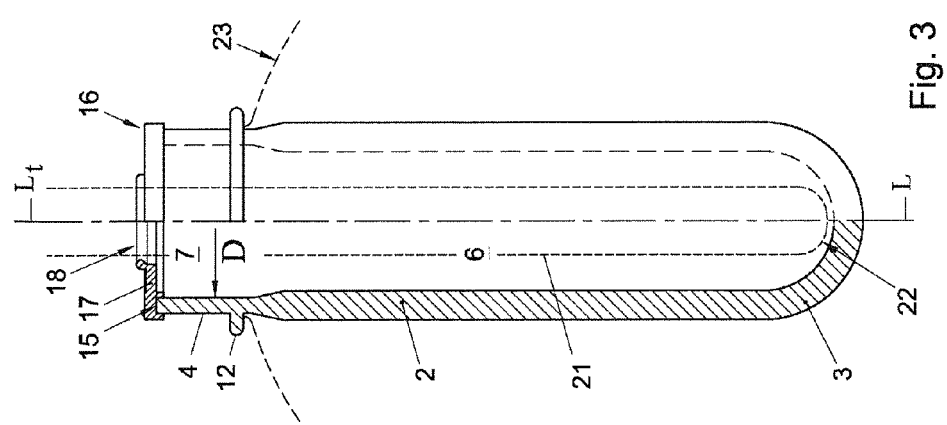
FIG. 5 schematically shows a third embodiment of a preform.
Figure 6:
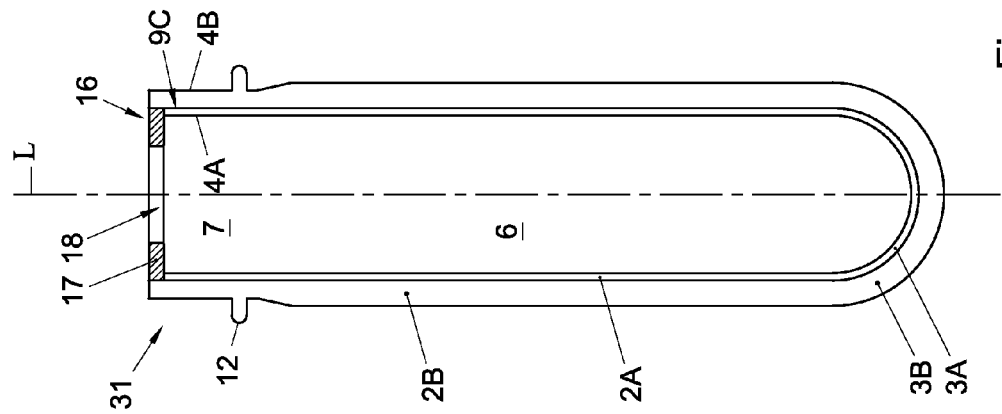
FIG. 6 schematically shows a preform assembly.
Figure 7:
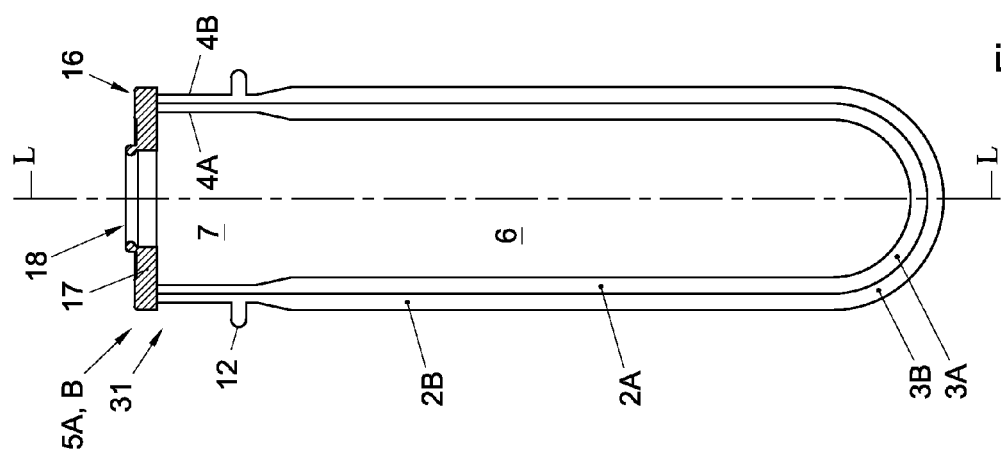
FIG. 7 schematically shows a further preform assembly.

In FIG. 5-7 preform assemblies 31 are shown, comprising a first preform 1A and a second preform 1B. The first preform 1A can have been inserted into the second preform 1B or vice versa. In an alternative embodiment one of the first and second preforms 1A, B can have been injected in or on the other of the two preforms 1A, B. The preforms 1A, B can have been injection moulded or otherwise formed separately, from the same or different materials. The preforms 1A, B can have some or all of the properties of preforms described before.

In the embodiment of FIG. 5 the first preform 1A can have a substantially cylindrical wall 2A with a closed first end 3A and a neck portion 4A at the opposite second end 5A. An inner volume 6 extends from a neck opening 7 into an inner space 8. The inner space 8 is largely defined by an inner surface 9. A lid element 16 such as a ring 17 has been mounted on the neck portion 4A, having a central opening 18 with a diameter $D_i$ smaller than the diameter $D_{ni}$ of the neck portion 4A and/or has an outer diameter $D_o$ larger than the outer diameter $D_{no}$ of the neck portion 4A. The lid element 16 can again have been mounted in any suitable way, for example as disclosed here above. The second preform 1B can have a substantially cylindrical wall 2B with a closed first end 3B and a neck portion 4B at the opposite second end 5B. The neck portion 4B can be wider than a body forming portion thereof, defined by the wall 2B. A shoulder 32 is provided between the neck portion 4B and the wall 2B, on which the lid element 16 or a flange or partial flange extending from the neck portion 4B can rest, when the first preform 1A is inserted into the second preform 1B. This way the first preform 1A can for example be suspended in the second preform 1B. In FIG. 5 the outer surface of the first preform 1A is spaced apart over at least part of the surface from the inner surface 9B of the second preform 1B. A space 33, for example filled with a gas such as air can be provided between said two surfaces. This space 33 can be closed off to the environment by the ring 17. Upon blow moulding the container from the preform assembly 31 the space 33 can be maintained, such that the container may become more rigid and light. In another embodiment the space 33 may be in communication with the environment, for example through one or more openings 18A (FIG. 9) in the ring 17 and/or by leaving some space between at least part of the ring 17 and the surrounding wall of the neck 4B of the second preform 1B. This way pressure can be relieved from the space 33 and/or in the container 23 a pressure fluid such as but not limited to gas, for example air, can be brought into the space 33, for compression off the container part 23A blow moulded from the first preform 1A. In still another embodiment the space 33 can be filled with a curable fluid or with a coating, such as but not limited to a coating providing a barrier against migration of gas such as O2 into and/or out of the container, a scavenger for such gas, for example for O2, and/or a colouring. The coating can be provided as a layer on or in a preform, can be a foil such as an in mould label, and can for example extend over all of the space or only part thereof.

In FIG. 6 the preform assembly 31 comprises a first preform 1A that fits relatively snugly into the second preform 1B, the ends 5A, B thereof lying substantially in the same plane. A lid element 16 comprising an opening 18 is provided on at least one of the two preforms 1A, B. In the embodiment shown the lid element 16 has a peripheral ring 17 extending outside the outer surface 9C of the neck portion 4B. Preferably the lid element 16 is at least connected to the second preform 1B, thus enclosing the first preform 1A within the second preform 1B.

In FIG. 7 the preform assembly 31 comprises a first preform 1A that fits into the second preform 1B, the end 5A of the first preform 1A lying below the end 5B of the second preform 1B. A lid element 16 comprising an opening 18 is provided on at least one of the two preforms 1A, B, preferably the first preform 1A. In the embodiment shown the lid element 16 has a peripheral ring 17 extending to or preferably slightly outside the outer surface 9C of the neck portion 4A. The peripheral ring 17 can be slightly flexible or compressible, such that the lid element 16 can be press fitted into the opening 7 within the neck 4B of the second preform 1B. Thus the first preform 1A can be easily fixated inside the second preform 1B, for example storage and transport and during (stretch) blow moulding.

The wall thickness of at least a body forming portion of the preform or preforms is preferably such that the preform is substantially amorphous. The container blow moulded there from is preferably stretched such that the plastic material is substantially crystalline. The plastic material preferably is substantially free of crystallisation preventing additives, such as but not limited to glycol or similar additives. Preferably the preform or preforms have a maximum wall thickness of less than 8 mm, preferably less than 6 mm, especially but not exclusively when the plastic material is substantially PET or a PET blend.

In FIG. 8 a container is shown, blow moulded, such as but not limited to stretch blow moulded from a preform 1 or preform assembly 31. A lid element 16 is provided on the neck 4. A valve 20 is provided in the opening 18, which can be an aerosol type valve. The valve 20 can be clinched or clamped on the lid element 16, for example in the tube or ring 19, using a connector or locking element 27, for example a clinch plate. A riser pipe 26 is connected to the valve 20 for dispensing the beverage from the inner volume 6 of the container 23. In FIG. 8 a pressure regulator 34 is provided in the inner volume 6 of the container, from which gas such as CO2 can be introduced into said volume 6, in order to keep the pressure within the container 23 at a desired level or within desired limits, for example at or near a equilibrium level of gas in the beverage. In such embodiment the container can be self regulating. In another embodiment the pressure regulator can be omitted and gas can be introduced via for example the valve 20 or another opening or valve into the inner volume 6.

Figure 9:
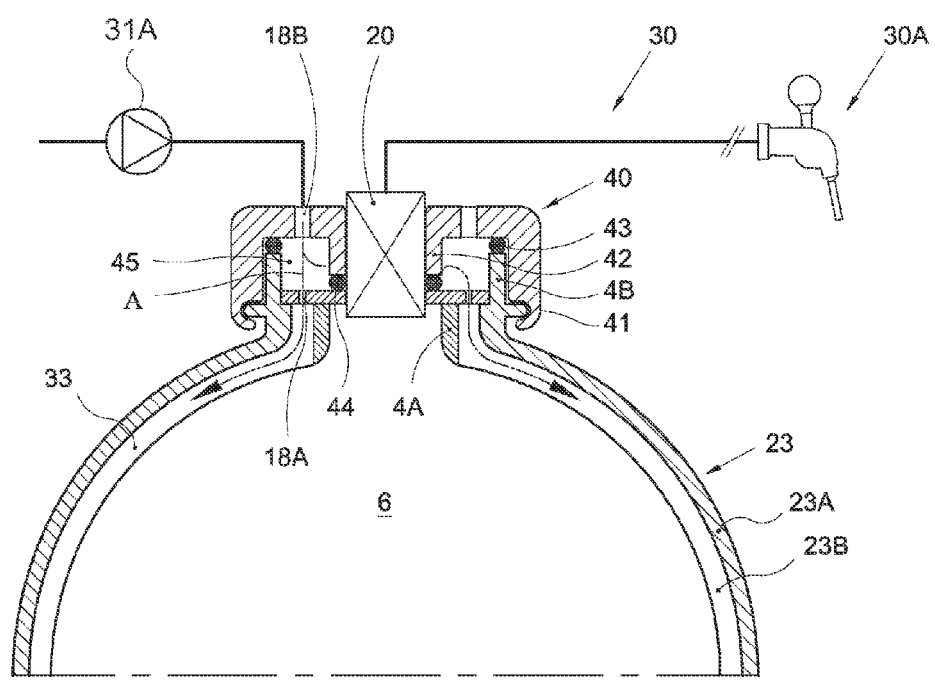
FIG. 9 schematically shows an alternative embodiment of a container manufactured according to the description, with connecting means.

FIG. 9 shows schematically part of a container 23 blow moulded, such as stretch blow moulded from a preform 1 or preform assembly 31 such as discussed before. In this embodiment an inner container part 23A is provided, blow moulded from a first preform 1A, and an outer, second container part 23B blow moulded from the second preform 1B. At least a part of the container parts 23A, B are not interconnected or at least releasable from each other. A lid element 16 is provided on the neck 4A of the inner container part 23A, resting on a shoulder 32 of the second container part 23B. The inner container part 23A is at least partly flexible. The container 23 preferably has been blow moulded integrally from the first and second preforms 1A, B. At least one opening 18A is provided in the lid element, opening into a space 33 between the inner and outer container parts 23A, B. A lid 40 is provided over the neck 4, clamped under the flange 12 with a peripheral portion 41. A valve 20 is provided in the lid 40, surrounded at least partly by a skirting 42. A first seal 43 is provided between the end 5B of the neck 4B of the outer container part 23B, whereas a second seal 44 is provided between the lid element 16 and the lower end of the skirting 42. Thus a space 45 is provided around the skirting 42, in fluid connection with the or each opening 18A.

In the embodiment of FIG. 9 a pump 31A is connected to a second opening 18B in the lid 40, opening into the space 45. Through this pump pressurised fluid, such as air can be introduced into the space 45 and from said space 45 through the opening 18A into the space 33 between the container parts 23A, B, as indicated by the arrows A, compressing the inner container part 23A at least partly, for forcing the beverage from the inner volume 6 into the dispensing device 30 through the valve 20.

The present disclosure is not limited to the embodiments disclosed or discussed herein by way of examples only.

Other embodiments can fall within the inventive concept as defined by the claims. For example any combination of parts and features of the embodiments disclosed are considered to have been disclosed in this description. In another embodiment the preform can have an opening at two opposite ends, wherein a lid element 16 is provided at at least one of the openings. For example one end can have a neck portion 4 and the opposite end a foot portion with an opening in which a valve element is provided as a lid element 16. Another example can be a lid element 16 including a valve element or at least part thereof, wherein a blow moulding tool can be introduced through the valve element or part thereof or can be connected to it for blowing the preform into a container. In an embodiment the lid element 16 can close off only part of the neck portion 4, such that the opening 18 is at least partly defined by the lid element and partly by the neck portion. These and other embodiments such as variations are considered to have been disclosed herein.

The invention claimed is:

1. Preform or preform assembly for blow moulding a container, wherein the preform or preform assembly has a neck portion defining a neck opening, a lid element being provided extending over the neck portion, an opening extending into the neck portion, providing access to an internal space of the preform or preform assembly, wherein the lid element is provided with the opening, which opening has a cross section which is smaller than an inner cross section of the neck opening.

2. Preform or preform assembly according to claim 1, wherein the lid element is provided with the opening.

3. Preform or preform assembly according to claim 1, wherein the lid element is connected to the neck portion permanently.

4. Preform or preform assembly according to claim 3, wherein the lid element is connected to the neck portion by welding.

5. Preform or preform assembly according to claim 3, wherein the lid element is connected to the neck portion by ultrasonic welding, laser welding, friction welding, spin welding or pressure welding.

6. Preform or preform assembly according to claim 3, wherein the lid element is connected to the neck portion by gluing.

7. Preform or preform assembly according to claim 1, wherein the lid element is provided on the neck portion and the opening is dimensioned for introducing a blow moulding tool into the preform or preform assembly.

8. Preform or preform assembly according to claim 1, wherein the lid element is attached to the preform or preform assembly using a press fit.

9. Container blown from a preform or preform assembly according to claim 1.

10. Container blow moulded from a preform assembly according to claim 1.

11. Method for blow moulding a container, comprising the steps of attaching a lid element to a preform or preform assembly and extending a blow moulding tool into the preform or preform assembly after attaching the lid element, wherein the lid element is connected to the preform or preform assembly by welding or gluing.

12. Method according to claim 11, wherein the lid element is welded to the preform or preform assembly using a welding technique chosen from the group of ultrasonic welding, spin welding, laser welding and pressure welding.

13. Method for blow moulding a container, comprising the steps of attaching a lid element to a preform or preform assembly and extending a blow moulding tool into the preform or preform assembly after attaching the lid element, wherein the lid element is connected to the preform or preform assembly by press fitting.

14. Method for blow moulding a container, comprising the steps of attaching a lid element to a preform or preform assembly and extending a blow moulding tool into the preform or preform assembly after attaching the lid element, wherein the lid element is connected to the preform or preform assembly by gluing.

15. Method for blow moulding a container, comprising the steps of attaching a lid element to a preform or preform assembly and extending a blow moulding tool into the preform or preform assembly after attaching the lid element, wherein a container is blown from the preform or preform assembly, having the lid element connected to the preform or preform assembly, wherein a beverage is introduced into the container through the lid element.

16. Preform or preform assembly for blow moulding a container, wherein the preform or preform assembly has a neck portion, wherein the neck portion has a neck opening, a lid element being provided at the neck portion, extending over said neck opening, the lid element provided with an opening extending into the neck portion, providing access to an internal space of the preform or preform assembly for a blow moulding tool.

17. Preform assembly for blow moulding a container, wherein the preform assembly has a neck portion defining a neck opening, a lid element being provided at the neck portion, an opening extending into the neck portion, providing access to an internal space of the preform assembly, wherein the preform assembly comprises at least an inner and an outer preform, wherein the lid element is provided with the opening and the lid extends over the neck portion.

18. Container blow moulded from a preform or preform assembly, wherein the preform or preform assembly has a neck portion defining a neck opening, a lid element being provided extending over the neck portion, an opening extending into the neck portion, providing access to an internal space of the preform or preform assembly, wherein the lid element is provided with the opening, which opening has a cross section which is smaller than an inner cross section of the neck opening, wherein the lid element has been permanently fixed to the preform or preform assembly prior to blow moulding.

19. Container blow molded using a method for blow moulding a container, the method comprising the steps of attaching a lid element to a preform or preform assembly and extending a blow moulding tool into the preform or preform assembly after attaching the lid element, wherein a preform or preform assembly is used having a neck portion defining a neck opening, a lid element being provided extending over the neck portion, an opening extending into the neck portion, providing access to an internal space of the preform or preform assembly, wherein the lid element is provided with the opening, which opening has a cross section which is smaller than an inner cross section of the neck opening, wherein the lid element has been permanently fixed to the preform or preform assembly prior to blow moulding.

20. Method for blow moulding a container, comprising the steps of attaching a lid element to a preform or preform assembly and extending a blow moulding tool into the preform or preform assembly after attaching the lid element, wherein the lid element has been permanently fixed to the preform or preform assembly prior to blow moulding.

* * * * *